United States Patent
Wrighton et al.

(10) Patent No.: US 7,673,109 B2
(45) Date of Patent: Mar. 2, 2010

(54) RESTRICTING TYPE ACCESS TO HIGH-TRUST COMPONENTS

(75) Inventors: David Charles Wrighton, Redmond, WA (US); Robert Sadao Unoki, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 460 days.

(21) Appl. No.: 11/567,871

(22) Filed: Dec. 7, 2006

(65) Prior Publication Data

US 2008/0126740 A1 May 29, 2008

(51) Int. Cl.
*G06F 12/00* (2006.01)

(52) U.S. Cl. .................... 711/163; 711/164
(58) Field of Classification Search ............. 711/163
See application file for complete search history.

(56) References Cited

U.S. PATENT DOCUMENTS

| | | | |
|---|---|---|---|
| 4,926,476 A | 5/1990 | Covey | |
| 6,081,665 A | 6/2000 | Nilsen | |
| 6,151,703 A | 11/2000 | Crelier | |
| 6,275,938 B1 | 8/2001 | Bond et al. | |
| 6,505,300 B2 | 1/2003 | Chan et al. | |
| 6,625,710 B2 * | 9/2003 | Bonola | 711/171 |
| 6,640,279 B2 | 10/2003 | Levy | |
| 6,775,779 B1 | 8/2004 | England et al. | |
| 6,851,108 B1 | 2/2005 | Syme | |
| 6,883,098 B1 | 4/2005 | Roman et al. | |
| 6,978,018 B2 * | 12/2005 | Zimmer | 380/30 |
| 7,020,772 B2 | 3/2006 | England et al. | |
| 7,216,341 B2 * | 5/2007 | Guarraci | 717/127 |
| 2003/0236986 A1 | 12/2003 | Cronce | |
| 2004/0255268 A1 | 12/2004 | Meijer | |
| 2005/0071513 A1 | 3/2005 | Aguilar | |
| 2005/0071616 A1 | 3/2005 | Zimmer | |
| 2005/0172126 A1 | 8/2005 | Lange | |
| 2005/0172286 A1 | 8/2005 | Brumme | |

(Continued)

OTHER PUBLICATIONS

"A Secure Environment for Untrusted Helper Applications (Confining the Wily Hacker)," by Ian Goldberg, David Wagner, Randi Thomas, and Eric Brewer, Computer Science Division, University of California, Berkeley, Jul. 1996, [online] [retrieved on Nov. 16, 2006], 14 pgs.. Retrieved from the Internet: http://www.usenix.net/publications/library/proceedings/sec96/full_papers/goldberg/goldberg.pdf.

(Continued)

*Primary Examiner*—Hong Kim
*Assistant Examiner*—Ngoc V Dinh
(74) *Attorney, Agent, or Firm*—Workman Nydegger

(57) ABSTRACT

Sensitive data structures, such as type data structures, can be used by untrusted application programs without necessarily exposing the sensitive data structures directly. For example, untrusted components, such as application programs that may or may not be type safe, can be allowed to operate in a lower-privilege mode. In addition, the application programs can be associated with an address space with limited permissions (e.g., read-only) to a shared memory heap. Requests by the untrusted components for sensitive data structures can then be handled by trusted components operating in a higher-privilege mode, which may have broader permissions to the shared memory heap. If the requests by the untrusted components are deemed to be valid, the results of the requests can be shared with the lower-privilege mode components through the shared memory heap.

16 Claims, 3 Drawing Sheets

U.S. PATENT DOCUMENTS

2005/0273605 A1  12/2005  Saha et al.
2006/0101446 A1   5/2006  Mariani
2006/0123403 A1   6/2006  Bruecklmayr

OTHER PUBLICATIONS

"Going Beyond the Sandbox: An Overview of the New Security Architecture in the JAVA Development Kit 1.2," by Li Gong, Marianne Mueller, Hemma Prafullchandra and Roland Schemers, JavaSoft, Sun Microsystems, Inc., Dec. 1997, [online] [retrieved on Nov. 16, 2006], 11 pgs.. Retrieved from the Internet: http://www.usenix.org/publications/library/proceedings/usits97/full_papers/gong/gong.pdf.

"Secure Execution Via Program Shepherding," by Vladimir Kiriansky, Derek Bruening, and Saman Amarasinghe, Laboratory for Computer Science, Massachusetts Institute of Technology, Aug. 2002, [online] [retrieved on Nov. 16, 2006], 16 pgs.. Retrieved from the Internet: http://www.asociacion-aecsi.es/doc/Programming_Secure_Execution_Via_Program_Shepherding.pdf.

"A Flexible Containment Mechanism for Executing Untrusted Code," by David S. Peterson, Matt Bishop and Raju Pandey, Department of Computer Science, University of California, Davis, Date Unknown, [online] [retrieved on Nov. 16, 2006], 19 pgs.. Retrieved from the Internet: http://www.madness.at/~mad/synz/2002-sandbox.pdf.

Secure Execution Via Program Shepherding, by Vladimir Kiriansky, Derek Bruening and Saman Amarasinghe, Aug. 2002, [online] [retrieved on Oct. 26, 2006], 16 pgs. Retrieved from the Internet: http://www.cag.lcs.mit.edu/rio/security-usenix.pdf.

Overview of the IBM Java Just-in-Time Compiler, by T. Suganuma, T. Ogasawara, M. Takeuchi, T. Yasue, M. Kawahito, K. Ishizaki, H. Komatsu, and T. Nakatani, Copyright 2000, IBM Corporation, IBM Systems Journal, vol. 39, No. 1, 2000 [online] [retrieved on Oct. 26, 2006], 19 pgs. Retrieved from the Internet: http://www.research.ibm.com/journal/sj/391/suganuma.pdf.

Efficient JAVA VM Just-in-Time Compilation, by Andreas Krall, Date Unknown, [online] [retrieved on Oct. 26, 2006], 8 pgs. Retrieved from the Internet: http://ieeexplore.ieee.org/ie14/5882/15667/00727250.pdf?isNumber=&htry=3.

Security in Untrusted Code Environments: Missing Pieces of the Puzzle, by Valentin Razmov, Mar. 30, 2002, Dept. of Computer Science and Engineering, University of Washington, [online] [retrieved on Oct. 26, 2006], 22 pgs. Retrieved from the Internet: http://www.cs.washington.edu/homes/valentin/security-past/generals/Valentin-Generals.pdf.

Hunt, Galen C. et al., "Singularity: Rethinking the Software Stack", ACM SSIGOPS Operating Systems Review, vol. 41 Issue 2, Apr. 2007, pp. 37-49.

\* cited by examiner

| Memory Manager *160* | | |
|---|---|---|
| Page Table *165* | | |
| Memory Location | Address Space *117* | Address Space *127* |
| *140* | Read Only | Read / Write |
| *170* | No Access | Read / Write |

RESTRICTING TYPE ACCESS TO HIGH-TRUST COMPONENTS

CROSS-REFERENCE TO RELATED APPLICATIONS

The present invention incorporates by reference the entire contents of U.S. patent application Ser. No. 11/564,249, filed on Nov. 28, 2006, entitled "COMPILING EXECUTABLE CODE INTO A LESS-TRUSTED ADDRESS SPACE."

BACKGROUND

1. Background and Relevant Art

As computerized systems have increased in popularity, so have the various application programs used on the computerized systems. In particular, there are now a wide range of applications programs configured for any number of purposes, whether to function as complex operating systems, databases, and so forth, or as a simple calculator. In many cases, software developers will write new application programs with a particular operating system in mind, using any number of appropriate programming languages. Once the software is complete, the developer will compile the application into machine-executable code, which can then be installed on a computer system with the appropriate operating system.

One will appreciate, therefore, that there are a number of considerations that often must be considered by developers of operating systems as well as of the individual application programs. Many of these interests may even be competing. For example, many application program developers may have interests related to quick and fast operation, while many operating system developers may have interests related to security and stability. In some cases, the security and stability requirements can cause some application programs to have slower execution and/or lower-performance.

For example, the operating system may be configured to have application programs run in a less-trusted "user" level, but have other system components run in a trusted "kernel" level. As a result, an application program running in a user level might only be able to perform certain types of functions by requesting the given function through an intermediary, trusted component. The intermediate component can then validate the request and then pass the request for the function to a kernel level component, which can then execute the request.

Other ways of managing security are to limit the various applications and components to specific readable, writable, and/or executable permission spaces. For example, an operating system might allow certain application programs to run only in a less privileged address space. This might allow the application programs to execute any existing instructions, but would prohibit the application from performing any write operations to security-sensitive areas of memory. By contrast, the operating system might allow other sensitive system components to operate only in an address space where dynamically generated code cannot be executed. This might allow the sensitive components to generate new code, but would prevent that new code from executing in the context of the sensitive system component.

In still other cases, an operating system might allow only certain kinds of application programs that conform to a certain code of standards to run in a high privilege address space. For example, the operating system might only allow "type-safe" applications to run in a read/write/execute address space. In general, a "type" is a data structure that classifies values and expressions, and indicates a generic meaning or intended purpose of those values and expressions in an operating system. An example of a type-safety rule might be one that precludes an integer value from being added to a floating point value. A type-safe compiler could then be used to compile only that executable program code that is type-safe (e.g., causes a compilation fault if coming across code that is configured to add an integer to a floating point value), and thus trusted by the operating system.

In general, at least one advantage of only allowing type-safe applications is that the operating system developer can allow certain sensitive components or data structures to co-exist in the same address space. For example, an operating system may be configured so that an application program executes in the same read/write/execute address space in which the "type" data structures themselves are found. This is due in part since there may be a need for the application to access the type data structures, and since the executing application—being type-safe—will not make improper access requests or modifications of the type data structures.

Unfortunately, restrictions such as type-safety are believed by some application developers to conflict with speed and performance considerations. Such beliefs tend to be particularly acute among developers of applications such as video games, where speed and performance considerations may be placed at a premium. In some cases, therefore, the developers of certain applications may find it better or more efficient to ignore specific code specifications, such as type-safety. This can create a conflict for corresponding operating system developers, who may want to open up an operating system to the development and execution of high performance applications, but still maintain the benefits of type-safety.

BRIEF SUMMARY

Implementations of the present invention provide systems, methods, and computer program products configured to allow the execution of untrusted application programs in a manner that preserves the integrity of type data structures in the presence of untrusted application code (e.g., type-unsafe). In one implementation, for example, type data structures are placed in a memory address space that has read/write access to a shared memory location. By contrast, certain application programs (which may or may not be trusted) are assigned to execute in an address space that has read access to the shared memory location. In addition, applications are designated as user mode components that can only access a type data structure through a kernel mode component. As such, an operating system can be configured to execute untrusted (e.g., non-type-safe) applications without danger of improper access to important type data structures.

For example, a method of restricting access by one or more application programs to one or more type data structures can involve executing one or more application programs in a lower-privilege mode in a first address space associated with one set of permissions. The method can also involve receiving one or more requests from the one or more application programs for type information corresponding to one or more type data structures in a memory location. In addition, the method can involve processing the one or more requests via one or more kernel mode components operating in a second address space associated with a different set of permissions. Furthermore, the method can involve passing type information corresponding to the processed one or more requests into a shared memory heap. The one or more application programs can then access the type information in the shared memory heap.

In addition, another method of restricting access by the one or more application programs to one or more type data structures can involve storing one or more type data structures in a memory location. The method can also involve setting one or more permissions in a page table, such that a first address space has no access to the memory location, and read-only access to a shared memory heap. In addition, the method can involve setting one or more different permissions in the page table, such that a second address space has read/write access to the shared memory heap. Furthermore, the method can involve directing to a component of the second address space any access request by any component of the first address space for the one or more type data structures in the memory location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
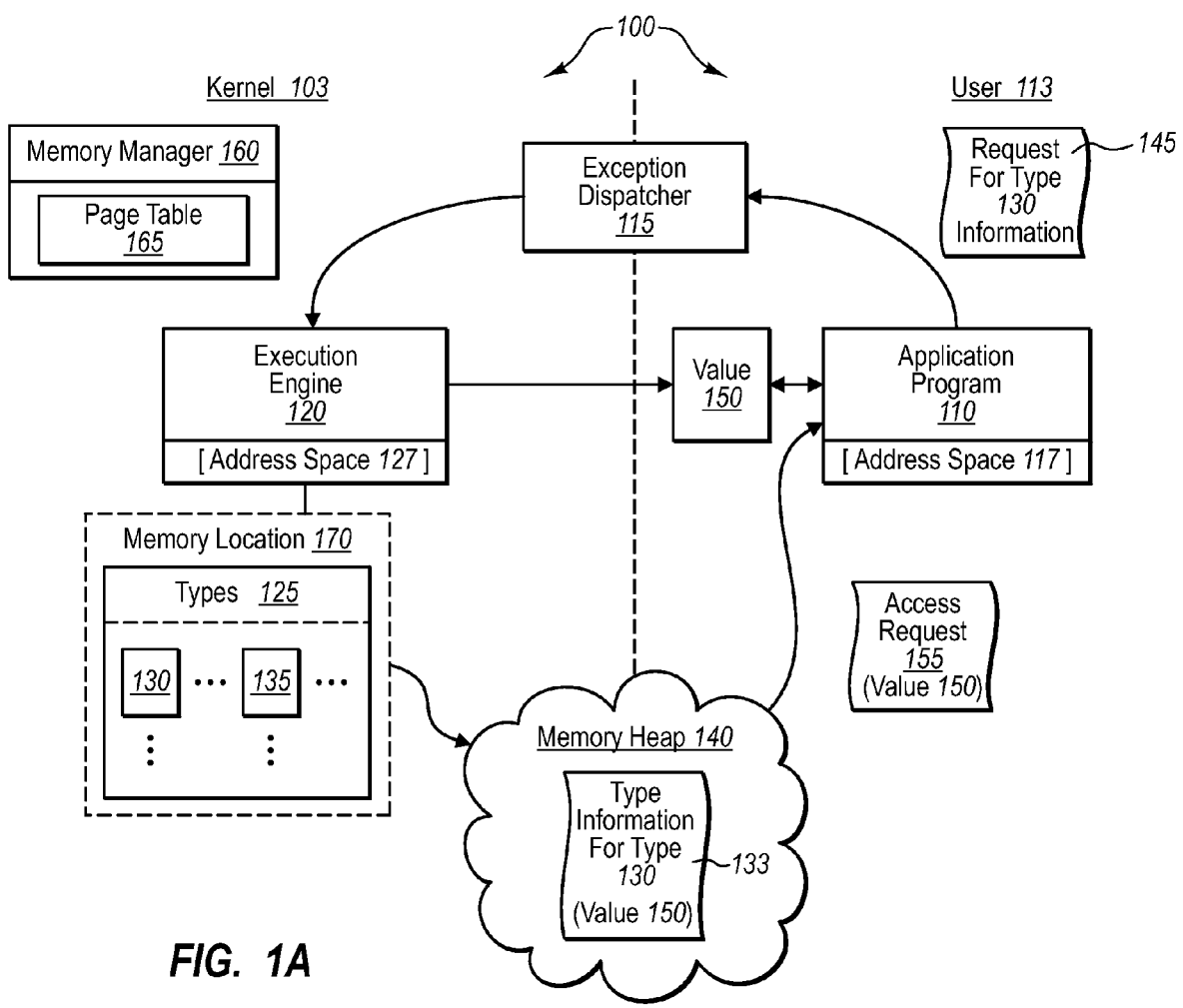
FIG. 1A illustrates an overview schematic diagram in accordance with an implementation of the present invention in which an application program operating in a lower-privilege mode operates on or otherwise accesses type information through one or more higher-privilege mode components.

Implementations of the present invention extend to systems, methods, and computer program products configured to allow the execution of untrusted application programs in a manner that preserves the integrity of type data structures in the presence of untrusted application code (e.g., type-unsafe). In one implementation, for example, type data structures are placed in a memory address space that has read/write access to a shared memory location. By contrast, certain application programs (which may or may not be trusted) are assigned to execute in an address space that has read access to the shared memory location. In addition, applications are designated as user mode components that can only access a type data structure through a kernel mode component. As such, an operating system can be configured to execute untrusted (e.g., non-type-safe) applications without danger of improper access to important type data structures.

Thus, and as will be appreciated more fully herein, at least one important aspect of the present invention is the interaction between untrusted code and the trusted higher-privilege code with respect to a type system. In particular, implementations of the present invention are configured generally to protect access to types in a similar way that "traditional" operating systems protect access to higher-privilege objects (e.g., kernel objects).

In general, an operating system capable of securely running non-type safe, unsigned code can be based on at least two principles. For one, the operating system can confine the untrusted program code to an address space that cannot directly manipulate any resources that could be used to compromise system security. Second, any interaction between the untrusted code and the operating system kernel can be allowed through a type system, which is used to control access to security critical resources. Since the untrusted code is confined to a "sandbox" space (i.e., a restricted, safe space), the untrusted code can be permitted to perform any operations it wishes, as long as it never leaves the confines of the sandbox.

As will be understood more fully herein, the operating system can be configured to enforce these security rules by providing a type system through which the untrusted code interacts with the kernel. In general, this type system can provide the operating system a point of control through which the operating system can govern access to security critical resources, such as the address spaces of both the sandbox an the kernel, including the ability to load and execute code in those address spaces. In at least one implementation, therefore, an operating system can be configured to elevate the type data structure to the same level as traditional operating system resources, such as the graphics processor, the file system, the network, and so on.

System integrity, therefore, can be maintained at least in part by restricting code executing in the sandbox from directly loading executable CPU (central processing unit) instructions into memory and executing them. System integrity can also be maintained by restricting access to particular address spaces controlled by the operating kernel. In addition, system integrity can be maintained by restricting the execution of arbitrary code that has been loaded into the address space in which the operating system kernel resides.

As previously mentioned, a "type" is a data structure, such as a software component configured to model some entity such as a file, or a string of characters. With respect to a video game application, a type data structure may be configured to model the player of a game, the player's score, and the like. In general, an application interacts with a instance of a type through a set of well-defined members configured to define how the type behaves. Some specific examples of types/type data structures that may be used in one implementation practiced in a MICRO SOFT operating environment can include "System. File," "Graphics. Triangle," "System. String," and "Application.Player." Reference herein to MICRO SOFT operating components, however, is exemplary only, as the components and modules described herein can be practice in a wide range of operating environments.

In any event, while types are generally created by higher-privilege components of an operating system (e.g., kernel mode components), not all interactions between the untrusted application programs and particular type data structure will necessarily go back through the higher-privilege mode components. Rather, such would be reserved primarily for those operations that access a security critical resource such as memory, a file, or the network. In many cases, for example, the operation that requires the involvement of the higher-privilege component is the generation of new executable machine instructions (e.g., from managed code).

In managed code systems, the binary files that make up a particular application program (e.g., 110) may not exclusively contain instructions that are immediately executable by the processor. Instead, the application program can contain instructions in an intermediate language (or references to intermediate language components) that still need to be translated into machine instructions before that particular code can be executed. This is generally referred to as "Just-In-Time" compilation, or "JIT." In general, the compilation of JIT code occurs on a method-by-method basis when a given method is called for the first time. In one implementation of the present invention, therefore, an application program running in the "sandbox" may be prohibited from generating executable machine instructions, and, as such, method calls can be required to go through the higher-privilege mode components (at least the first time the method is called).

Referring now to the Figures, FIG. 1A illustrates an overview schematic diagram in which application program 110 gains access to any one or more types or type data structures. To this end, FIG. 1A shows that an operating system 100 can divide up components or component operations into higher and lower-privilege component levels of control. For purposes of illustration, these higher and lower-privilege components will be referred to herein as kernel mode 103 and user mode 113. One will appreciate that such designations, however, are not limiting, and that other component designations may be appropriate in other operating environments.

In any event, FIG. 1A illustrates that application program 110 is operating in user mode 113. In general, implementations of the present invention can be configured to allow a wide range of application programs associated with various levels of trust, ranging from trusted applications that may be digitally signed or certified by an operating system, as well as application programs that contain untrusted or even malicious code. Since there may otherwise be no certainty in the ability to trust a particular application program, implementations of the present invention will generally require application programs to operate in user mode, as well as in a restricted address space (e.g., FIG. 1B).

Similarly, operating system 100 can be configured so that the collection of type data structures 125, such as type data structures 130, 135, etc., are only accessible by a kernel mode components. For example, FIG. 1A shows that kernel mode 103 components, such as execution engine 120, may be provided with direct access to the collection of type data structures 125. As a result, if a user mode component needs to access a data structure that is restricted to kernel mode components (e.g., type data structures, specific memory access allocations, etc.), the user mode component will need to defer the request to an appropriate kernel mode component.

For example, FIG. 1A shows that application program 110 prepares and sends an access request 145 for type 130, which is ultimately handled by exception dispatcher 115. In general, exception dispatcher 115 receives request 145 in user mode 113, but identifies that request 145 needs to be handled by one or more components operating in kernel mode. As such, exception dispatcher 115 can transition out of user mode, so that system 100 can begin operating in kernel mode 103.

In kernel mode 103, exception dispatcher 115 can communicate the contents of request 145 to execution engine 120. Before processing request 145, however, execution engine 120 will generally need to perform one or more security validation tests on the request. For example, execution engine 120 can review request 145 for any number of tokens, handles, or security certificates. Execution engine 120 can also review request 145 for propriety, such as to determine whether the contents of request 145, if executed, could result in any improper alterations or deletions of a type data structure. In particular, some alterations of a type data structure may be allowed, but only perhaps by certain user mode components operating on certain parts of a type data structure. If execution engine 120 determines that the instructions of request 145 might exceed its bounds, execution engine 120 could deny or modify request 145 before executing it.

Assuming that request 145 is determined to be appropriate and/or valid, execution engine 120 can then process the request in user mode. In one implementation, execution engine 120 processes request 145 by passing data associated with the type to shared memory heap 140. In this or alternative implementations, execution engine 120 processes request 145 by passing only a portion of a type data structure, or simply information about a type data structure, to memory heap 140. Accordingly, FIG. 1A shows that execution engine 120 has passed type information 133 for type 130 to memory heap 140.

In addition, part of processing request 145 involves execution engine providing one or more values to application program 110, which can be used to access corresponding information passed to the shared memory heap. In one implementation, this value comprises any one or more of a handle, pointer, or the like, which can be used by application program 110 to address and or request type information 133. Thus, for example, FIG. 1A also shows that execution engine 120 has associated type information 133 for type 130 with value 150. Execution engine 120 then passes value 150 to the user 113 layer, so that application program 110 can access value 150. In one implementation, exception dispatcher 115 receives value 150, and determines that system 100 is ready to switch back to user mode 113. Nevertheless, it is not necessary that any one particular component receive such an indication from execution engine 120. In this or alternative implementations, for example, value 150 is simply placed in a memory register that is accessible to application program 110.

In any event, upon system 100 switching back to user mode, application program 110 can then use value 150 to access the requested type information 133. For example, FIG. 1A shows that application program 110, operating in user mode 113, sends access request 155 with corresponding value 150 to memory heap 140. Application program 110 can thus read the requested type information and use it as needed within user mode operations.

Memory heap 140 thus straddles the boundary between user mode 113 and kernel mode 103 operations. In effect, memory heap 140 acts as a cross-permission/cross-boundary store that is accessible by components operating in kernel mode 103 and/or in user mode 113. One will appreciate, therefore, that memory heap 140 can be used to help maintain the security boundaries between the two security layers by allowing application program 110 and execution engine 120 to function independently, in different privilege modes, without direct communication, even if physically stored in the same memory location.

Thus, one of the ways of creating a sandbox is to limit requests for type data structures to only those components operating in kernel mode 103. An additional way is to limit how various components can access a particular memory location (e.g., memory heap 140) through virtual address spaces. For example, FIG. 1A shows that the collection of type data structures 125 can be located in a particular memory location 170, and that application program 110 is associated with virtual address space 117, while execution engine 120 is associated with virtual address space 127. Memory manager 160 can then restrict the virtual address spaces 117 and 127 differentially, so that any component within that particular address space inherits the designated restrictions with respect to data in a physical memory location.

Figure 1B:
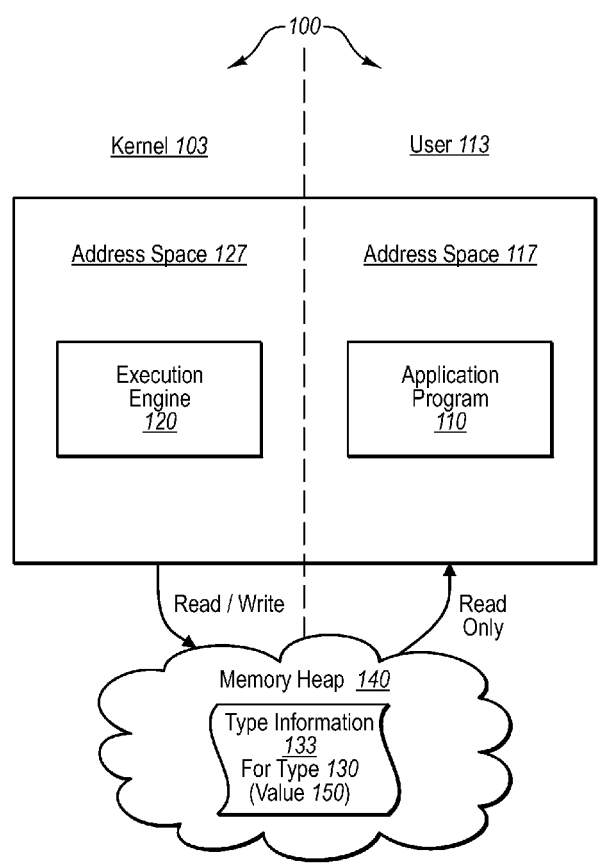
FIG. 1B illustrates an overview schematic diagram in which access to one or more memory locations is restricted by virtue of different permission sets provided to different address spaces.

As shown in FIG. 1B, memory manger 160 can manage or assign permissions to memory locations via address space correlations in page table 165. For example, page table 165 indicates that permissions for address space 117 (i.e., components operating within this address space) with respect to memory location 140 (i.e., "memory heap") are set to "read-only." By contrast, page table 165 indicates that address space 117 has no access rights to memory location 170, which, in this case, is where the collection of type data structures 125 reside. In addition, FIG. 1B shows that page table 165 indicates that permissions for address space 127 (i.e., components within this address space) with respect to memory locations 140 (i.e., "memory heap") and 170 are set to "read/write."

Thus components from different virtual memory address spaces can have different access permissions to the same information in the same physical memory location. This is true regardless of whether address spaces 117 and 127 actually reside in the same physical memory location, the same memory location as the memory heap 140 and/or memory location 170, or whether each address space is associated with data in different memory locations.

As discussed above with respect to page table 165, for example, any component associated with address space 117 (e.g., application program 110) will have no access rights to memory location 170, but will have read access rights to memory location 140. Similarly, any component associated with address space 127 (e.g., execution engine 120) can read and write to both memory locations 140 and 170. In addition, any component of address space 127, such as execution engine 120, will only have read/write access to memory location 170. Accordingly, an operating system developer can restrict operations of any number of components to a particular sandbox through any combination of privilege mode and/or address space assignments or restrictions.

FIGS. 1A-1B, therefore, provide a number of schematics and components for allowing untrusted code, such as program code that is not necessarily type-safe, to execute in a restricted space, and still operate with certain type safety considerations, as desired or needed. The above-described components can do this without necessarily opening up these data structures to malicious attacks. In particular, implementations of the present invention ensure that requests from untrusted code are either denied or allowed to operate only under parameters explicitly set forth by the operating system.

Figure 2:
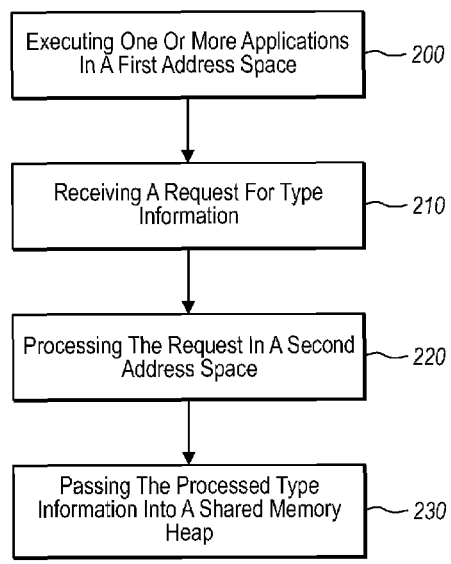
FIG. 2 illustrates a flowchart of a sequence of acts in a method in accordance with an implementation of the present invention.
Figure 3:
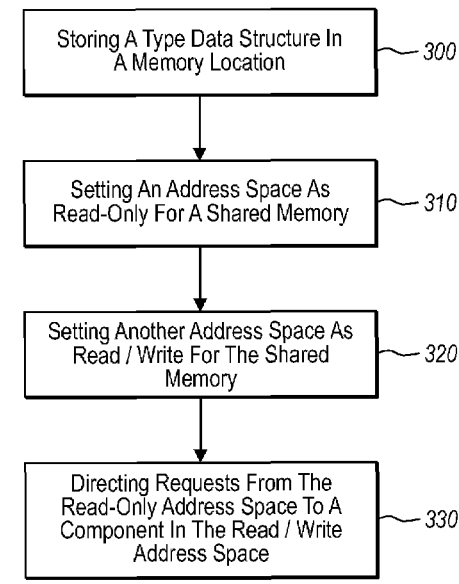
FIG. 3 illustrates another flowchart of a sequence of acts of another method in accordance with an implementation of the present invention.

Implementations of the present invention can also be described in terms of methods having one or more acts for accomplishing a particular result. For example, FIGS. 2 and 3 illustrates flow charts of acts in methods for restricting type data structures from lower-privilege level components, such as untrusted application programs. The methods of FIGS. 2 and 3 are discussed more fully below with respect to the components and diagrams of FIGS. 1A and 1B.

For example, FIG. 2 shows that a method in accordance with an implementation of the present invention can comprise an act 200 of executing one or more applications in a first address space. Act 200 includes executing one or more application programs in a lower-privilege mode in a first address space associated with one set of permissions. For example, FIG. 1A and 1B show that application program 110 operates with user mode privileges, and in an address space (e.g., 117) that has "read-only" permissions, for example, with respect to memory heap 140.

FIG. 2 also shows that the method can comprise an act 210 of receiving a request for type information. Type 210 includes receiving one or more requests from the one or more application programs for type information corresponding to one or more type data structures in a memory location. For example, FIG. 1A shows that application program 110 prepares and sends request 145, which includes an access request for information associated with type data structure 130.

In addition, FIG. 2 shows that the method can comprise an act 220 of processing the request in a second address space. Act 220 includes processing the one or more requests via one or more kernel mode components operating in a second address space associated with a different set of permissions. For example, FIGS. 1A and 1B show that request 145 is handled ultimately by execution engine 120. Execution engine, in turn, is a kernel mode 103 component that is associated with an address space 127 that has broader access rights/permissions, for example, with respect to shared memory heap 140.

Furthermore, FIG. 2 shows that the method can comprise an act 230 of passing the processed type information into a shared memory heap. Act 230 includes passing type information corresponding to the processed one or more requests into a shared memory heap, wherein the one or more application programs can access the type information. For example, FIG. 1A shows that execution program 120 processes request 145, and passes/writes corresponding type information 133 for type data structure 130 into memory heap 140.

In addition, FIG. 3 shows that an alternate method in accordance with an implementation of the present invention can comprise an act 300 of storing a type data structure in a memory location. Act 300 can include storing one or more type data structures in a memory location. For example, FIGS. 1A and 1B show that the collection of types 125 include data structure 130 and 135, and these types are stored in memory location 170.

FIG. 3 also shows that the method can comprise an act 310 of setting an address space as read-only for a shared memory. Act 310 includes setting one or more permissions in a page table, wherein a first address space is provided no access to the memory location, and provided read-only access to a shared memory heap. For example, FIG. 1B shows that a page table 165 indicates that address space 117 has no access to the memory location 170 in which the type data structures 125 are stored, but read-only access to shared memory heap 140.

In addition, FIG. 3 shows that the method can comprise an act 320 of setting permissions in an address space as read/write for the shared memory. Act 320 includes setting one or more different permissions in the page table, wherein a second address space is provided read/write access to the shared memory heap. For example, FIG. 1B shows that address space 127 is set in page table 165 with read/write permissions with respect to shared memory heap 140, as well as for memory location 170. As such, execution engine 120 (or any other component operating an address space 127) will have read/write permission with respect to memory locations 140 and 170.

Furthermore, FIG. 3 shows that the method can comprise an act 330 of directing a request from the read-only address space to a component in the read/write address space. Act 330 includes directing to a component of the second address space any access request by any component of the first address space for the one or more type data structures in the memory location. For example, as shown in FIG. 1A, application program 110, which is operating in address space 117, sends request 145 to exception dispatcher 155. Request 145 is then ultimately handled by execution engine 120, which is operating in a different address space 127.

Accordingly, one will appreciate that implementations of the present invention take a different approach to system security than otherwise practiced with operating system that is capable of running untrusted code in a secure fashion. Such an operating system that can enable any developer to create an application program without undue cost and process, while still maintaining the integrity of the operating system. Such security is possible despite allowing the execution of managed code, such as managed code running on JAVA or .NET platforms. In general, the primary means of interaction between the untrusted application programs and the operating system can be provided through a type system through which the operating system can use to control access to executable code and other resources.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computerized environment including one or more application programs that may or may not be trusted, and an operating system having one or more type data structures, a method of restricting access by the one or more application programs to the one or more type data structures, comprising the acts of:
   executing one or more application programs in a lower-privilege mode in a first address space associated with one set of permissions;
   receiving one or more requests from the one or more application programs for type information corresponding to one or more type data structures in a memory location;
   processing the one or more requests in order to validate at least one request via one or more kernel mode components operating in a second address space associated with a different set of permissions;
   for the validated request, passing type information corresponding to the validated request into a shared memory heap, wherein the one or more application programs can access the type information without accessing the type data structures of the operating system; and
   for the validated request, passing a value that is accessible to the one or more application programs, wherein the value is associated with the type information in the shared memory heap.

2. The method as recited in claim 1, wherein the one set of permissions of the first address space are set to read-only with respect to the shared memory heap.

3. The method as recited in claim 2, wherein the one set of permissions indicate that there is no access by any component in the first address space to the memory location.

4. The method as recited in claim 1, wherein the different set of permissions of the second address space are set to read/write with respect to the shared memory heap.

5. The method as recited in claim 4, wherein the different set of permissions indicate that there is read/write access by any component in the second address space to the memory location.

6. The method as recited in claim 1, further comprising an act of receiving the one or more application requests via an exception dispatcher component.

7. The method as recited in claim 6, wherein the exception dispatcher causes an exception to a lower-privilege mode runtime upon identifying that the one or more user requests require processing by a higher-privilege mode component.

8. The method as recited in claim 1, further comprising the acts of:
   receiving one or more new requests from the one or more application programs for the type information in the shared memory heap, wherein the one or more new requests include the value; and
   processing the one or more new requests in accordance with the one set of permissions for the first address space.

9. The method as recited in claim 1, further comprising the acts of:
   receiving a new request from the one or more application programs for different type information; and
   identifying that the different type information is already present in the shared memory heap.

10. The method as recited in claim 9, wherein the value is a pointer that refers to the different type information that is already present in the memory heap.

11. In a computerized environment including a memory, an operating system having one or more type data structures, and one or more application programs that may or may not be trusted by the operating system, a method of restricting access by the one or more application programs to the one or more type data structures, comprising the acts of:

storing one or more type data structures in a memory location;

setting one or more permissions in a page table, wherein a first address space is provided no access to the memory location, and is provided read-only access to a shared memory heap;

setting one or more different permissions in the page table, wherein a second address space is provided read/write access to the shared memory heap;

directing to a component of the second address space any access request by any component of the first address space for the one or more type data structures in the memory location;

reviewing the any access request from the any component of the first address space and processing the access request by the component of the second address space to determine that the request is valid;

for any request determined to be valid, passing type information corresponding to the validated request into the shard memory heap, wherein one or more application programs can access the type information without accessing type data structures of the operating system;

associating a value with type information corresponding to any access request determined to be valid when processed by the component of the second address space; and for any access request determined to be valid, providing the value to the any component in the first address space, wherein the value is accessible to the one or more application programs, wherein the value is associated with the type information in the shared memory heap.

12. The method as recited in claim 11, wherein the first address space and the second address space are in different memory locations.

13. The method as recited in claim 11, wherein the different memory locations of the first and second address spaces are different from the memory location in which the type data structures are stored.

14. The method as recited in claim 11, wherein the any component of the first address space is a user mode component, and the component of the second address space is a kernel mode component.

15. The method as recited in claim 14, further comprising an act of switching from a user mode runtime to a kernel mode runtime upon receiving the any access request from the any component of the first address space.

16. In a computerized environment including one or more application programs that may or may not be trusted, and an operating system having one or more type data structures, a computer program storage product having computer-executable instructions stored thereon that, when executed, cause one or more processors in a computer system to perform a method comprising:

executing one or more application programs in a lower-privilege mode in a first address space associated with one set of permissions;

receiving one or more requests from the one or more application programs for type information corresponding to one or more type data structures in a memory location;

processing the one or more requests in order to validate at least one request via one or more kernel mode components operating in a second address space associated with a different set of permissions;

for the validated request, passing type information corresponding to the validated request into a shared memory heap, wherein the one or more application programs can access the type information without accessing the type data structures of the operating system; and for the validated request, passing a value that is accessible to the one or more application programs, wherein the value is associated with the type information in the shared memory heap.

* * * * *